Patented Oct. 14, 1952

2,614,095

UNITED STATES PATENT OFFICE 2,614,095

HEAT STABILIZATION OF A CHLORINE CONTAINING POLYMER WITH A MERCAPTO ACID AMIDE

Thomas H. Shelley, Jr., Spottswood, N. J., assignor to The B. F. Goodrich Company, New York, N. Y., a corporation of New York No Drawing. Application June 15, 1951,
Serial No. 231,890

10 Claims. (Cl. 260—45.9)

This invention relates to heat stable polymer compositions and to the preparation of such compositions, and relates particularly to compositions containing a vinyl or vinylidene chloride polymer together with an N-hydrocarbon substituted amide of a mercapto-substituted aliphatic monocarboxylic acid as a stabilizer against the effect of heat.

Various polymer compositions containing a polymer of vinyl or vinylidene chloride are substantially clear when first prepared, but tend to deteriorate and darken in the presence of heat. Such compositions are of lessened value in applications where heat stability is an important consideration, for example, where the compositions are to be exposed to the action of the weather or to relatively high temperatures for relatively long periods of time.

Accordingly, it is an object of the present invention to provide vinyl and vinylidene chloride polymer compositions which exhibit a high degree of stability when exposed to the influence of heat. Other objects will be apparent from the description which follows.

I have now discovered that the above and other objects are readily attained by incorporating in the polymer composition a small quantity of an N-hydrocarbon substituted amide of a mercapto-substituted aliphatic monocarboxylic acid. In this manner polymer compositions are obtained which have greatly increased resistance to deterioration under the effects of heat.

The polymers which are stabilized by the mercaptoamides of the type referred to hereinabove, in accordance with this invention, include all polymers of a chloroethylene containing from 1 to 2 chlorine atoms attached to one only of the carbon atoms, that is, vinyl and vinylidene chloride, such as the homopolymers of these chloroethylenes, copolymers of these with each other and copolymers of such chloroethylenes preferably in predominant amounts with other materials copolymerizable therewith such as vinyl bromide, vinyl acetate, vinyl propionate, vinyl butyrate, vinyl chloroacetate, vinylidene bromide, vinylidene chlorofluoride, dimethyl fumarate, dimethyl maleate, dibutyl maleate, diethyl chloromaleate, methyl acrylate, ethyl acrylate, octyl acrylates, isononyl acrylate, decyl acrylate, methyl methacrylate, methyl ethacrylate, and the like. N-hydrocarbon substituted amides of mercapto-substituted aliphatic monocarboxylic acids also effectively stabilize polymers prepared from three or more polymerizable materials, one of which is a chloroethylene, such as tripolymers of vinylidene chloride, vinyl chloride and an acrylate and tripolymers of vinyl chloride, a higher acrylate such as n-octyl acrylate, and a third monomer such as acrylonitrile, styrene, vinyl acetate, vinyl benzoate, isobutylene or the like. High molecular weight polymers of vinyl chloride are especially effectively stabilized by the organic amides of this invention.

As disclosed hereinabove, the amides which stabilize vinyl resins in accordance with the present invention are N-hydrocarbon substituted amides of mercapto-substituted aliphatic monocarboxylic acids. The substituent which is attached to the nitrogen atom of the amide may be any hydrocarbon radical, aliphatic or aromatic, saturated or unsaturated. For example, it may be alkyl, aryl, aralkyl, alkaryl, alkenyl or the like, it being understood that the nature of the radical is not in any sense of the word critical so long as it is a hydrocarbon radical. It is desirable, however, that the hydrocarbon substituent contain from 1 to 10 carbon atoms.

Specific amides of the above general class which may be utilized to stabilize vinyl resin compositions include the following:

N-methyl mercaptoacetamide
N-ethyl mercaptoacetamide
N-hexyl mercaptoacetamide
N-decyl mercaptoacetamide
N-dodecyl mercaptoacetamide
N-allyl mercaptoacetamide
N-propargyl mercaptoacetamide
N-cyclohexyl mercaptoacetamide
N-phenyl mercaptoacetamide
N-naphthyl mercaptoacetamide
N-benzyl mercaptoacetamide
N-o-tolyl mercaptoacetamide
N-m-tolyl mercaptoacetamide
N-p-tolyl mercaptoacetamide
N-methyl-beta-mercaptopropionamide
N-ethyl-beta-mercaptopropionamide
N-butyl-beta-mercaptopropionamide
N-hexyl-beta-mercaptopropionamide
N-decyl-beta-mercaptopropionamide
N-dodecyl-beta-mercaptopropionamide
N-allyl-beta-mercaptopropionamide
N-propargyl-beta-mercaptopropionamide
N-phenyl-beta-mercaptopropionamide
N-naphthyl-beta-mercaptopropionamide
N-benzyl-beta-mercaptopropionamide
N-o-tolyl-beta-mercaptopropionamide
N-m-tolyl-beta-mercaptopropionamide
N-p-tolyl-beta-mercaptopropionamide
N-[p-(alpha-phenylisopropyl) phenyl] beta-mercaptopropionamide N-methyl-alpha-mercaptopropionamide
N-ethyl-alpha-mercaptopropionamide
N-decyl-alpha-mercaptopropionamide
N-dodecyl-alpha-mercaptopropionamide
N-allyl-alpha-mercaptopropionamide
N-phenyl-alpha-mercaptopropionamide
N-o-tolyl-alpha-mercaptopropionamide
N-m-tolyl-alpha-mercaptopropionamide
N-p-tolyl-alpha-mercaptopropionamide
N-[o-(alpha-phenylisopropyl) phenyl] beta-mercaptopropionamide
N-methyl-alpha-mercaptobutyramide
N-phenyl-beta-mercaptobutyramide
N-naphthyl-omega-mercaptobutyramide
N-methyl-alpha-mercaptovaleramide
N-allyl-beta-mercaptovaleramide
N-phenyl-beta-mercaptovaleramide
N-cyclohexyl-omega-mercaptovaleramide
N-o-tolyl-omega-mercaptovaleramide
N-m-tolyl-alpha-mercaptovaleramide
N-p-tolyl-beta-mercaptovaleramide
N-ethyl-alpha-mercaptocaproamide
N-propargyl-beta-mercaptocaproamide
N-phenyl-beta-mercaptocaproamide
N-naphthyl-omega-mercaptocaproamide
N-dodecyl-omega-mercaptocaproamide
N-methyl-alpha-mercaptoenanthamide
N-phenyl-beta-mercaptocaprylamide
N-allyl-gamma-mercaptocaprylamide
N-o-tolyl-beta-mercaptopelargonamide
N-p-tolyl-omega-mercaptopelargonamide
N-methyl-alpha-mercaptocapramide
N-allyl-alpha-mercaptocapramide
N-phenyl-beta-mercaptocapramide
N-o-tolyl-omega-mercaptocapramide There are, of course, a great many N-hydrocarbon substituted amides of mercapto-substituted aliphatic monocarboxylic acids other than those shown above, the compounds listed being merely representative members of the class.

Many, if not all of the compounds of this class are believed not to have been prepared heretofore, but they may be readily prepared by several methods. For example, they may be prepared by reacting a halo-acyl halide with an N-hydrocarbon substituted amine such as aniline to give an N-hydrocarbon substituted amide of a halo-substituted aliphatic monocarboxylic acid and then reacting this latter compound with sodium hydrogen sulfide to give the desired N-hydrocarbon substituted amide of a mercapto-substituted aliphatic monocarboxylic acid. The stabilizers of this invention may also be prepared by reacting a halo-substituted ester with an amine to give an amide and then reacting this amide with sodium hydrogen sulfide to give the desired mercaptoamide. N-hydrocarbon substituted beta-mercaptopropionamides are readily prepared simply by reacting 2-mercapto-4-keto dihydrothiazine with an amine to give a beta-dithiocarbamyl propionamide which can be hydrolyzed to form the beta-mercaptopropionamide, in the manner set forth in more detail in a copending application Serial No. 160,576, filed May 6, 1950.

Especially preferred stabilizers are the N-aryl-beta-mercaptopropionamides such as N-phenyl-beta-mercaptopropionamide, N-naphthyl-beta-mercaptopropionamide, N-o-tolyl-beta-mercaptopropionamide, N-p-tolyl-beta-mercaptopropionamide, N-m-tolyl-beta-mercaptopropionamide, and the like, the aryl radical most desirably containing from 6 to 10 carbon atoms.

The particular proportion of mercaptoamide employed is not critical, as little as 0.1% of the mercaptoamide or even less based on the weight of the polymer being effective. Also, as much as 5% of the mercaptoamide or more based on the weight of the polymer may be used, with an especially preferred range being from 0.1% to 3.0% by weight of the polymer. Although large amounts of stabilizer may be utilized, it is usually neither necessary nor desirable to use such amounts because large amounts will not increase appreciably the heat stability of the composition and in fact may be detrimental in that other physical properties of the composition, such as hardness and low temperature flexibility may be adversely affected.

The mercaptoamide stabilizers of this invention are useful with either plasticized or unplasticized compositions, but they are particularly valuable with compositions containing both polymer and plasticizer. The stabilizers may be added to the composition either before or after the plasticizer is added, or they may be dispersed or dissolved in a plasticizer prior to incorporation of the latter in the polymer composition. The amount of plasticizer used, of course, will depend upon the properties of the particular polymer and plasticizer as well as upon the properties desired in the finished composition and may vary from 20 to 600 parts by weight of the plasticizer for each 100 parts of polymer, usually being from 20 to 80 parts of plasticizer for each 100 parts of polymer.

Among the plasticizers which may be utilized are included tricresyl phosphate, dibutyl phthalate, butyl phthalyl butyl glycollate, dioctyl phthalates such as di-2-ethylhexyl phthalate, dinonyl phthalates, dibutyl sebacate, undecyl tetrahydro naphthyl ketone, and various chlorinated or nitrated aromatic compounds, aromatic or long-chain aliphatic esters, ethers or ketones, esters of inorganic acids or mixed aromatic aliphatic compounds, and the like.

The following examples will illustrate more fully the practice of this invention.

*Example I*

A solution consisting of 29.4 parts (0.2 mole) of 2-mercapto-4-keto-5,6-dihydrothiazine, 46.4 parts (0.5 mole) of aniline, 2.36 parts concentrated hydrochloric acid and 88 parts of benzene is refluxed for 4 hours and on cooling a precipitate forms. The precipitate is washed with petroleum ether and recrystallized from a heptane-alcohol solution to yield 11 parts of beta-dithiocarbamyl propionanilide (M. P. 135° C.–136.5° C.). The beta-dithiocarbamyl propionanilide is then dissolved in 5% aqueous sodium hydroxide solution and hydrochloric acid is added, whereupon N-phenyl-beta-mercaptopropionamide (M. P. 87°–89° C.) is obtained as a crystalline precipitate.

Compositions are then prepared having the following ingredients in parts by weight:

| | A | B | C | D |
|---|---|---|---|---|
| Polyvinyl chloride | 100 | 100 | 100 | 100 |
| Dioctyl phthalate | 50 | 50 | 50 | 50 |
| N-phenyl-beta-mercaptopropionamide | 0.1 | 1.0 | 3.0 | 0.0 |

These compounded compositions are molded for 3 minutes at 320° F. and cut into 6″ x 1″ x 0.02″ clear strips which are placed in a 150° C. forced draft oven and examined after periods of one-half hour, one hour, and two hours. At the end of two hours the stabilized stocks A, B and C are substantially clear while control stock D, which contains no stabilizer, is a dark brown color. The stability of the stock increases with the concentration of the stabilizer, stock C being the most stable of the three stabilized stocks.

*Examples II and III*

N-p-tolyl-beta-mercaptopropionamide (M. P. 86° C.–87° C.) is prepared utilizing the same molar quantities (substituting p-toluidine for aniline) and the procedure employed in Example I for preparing N-phenyl beta-mercaptopropionamide. N-o-tolyl-beta-mercaptopropionamide (M. P. 74–75° C.) is also prepared in the same manner, except that o-toluidine is substituted for the aniline of Example I.

Compositions are then prepared as in Example I except that in Example II, the N-p-tolyl-beta-mercaptopropionamide is substituted for N-phenyl-beta-mercaptopropionamide and in Example III, the N-o-tolyl-beta-mercaptopropionamide is substituted for the stabilizer of Example I. The stocks thus prepared are equivalent to N-phenyl-beta-mercaptopropionamide stabilized stocks in their ability to withstand the effects of heat.

Moreover, similarly excellent results are obtained when other of the mercaptoamides disclosed hereinabove, for example, N-methyl-mercaptoacetamide, N-allyl-beta-mercaptopropionamide, N-phenyl-omega-mercaptocapramide, and N-benzyl-alpha-mercaptocapyrylamide, are substituted for the stabilizers in the above examples. Also, when mercaptoamides are incorporated in more highly plasticized stocks and completely unplasticized stocks, excellent heat stability is obtained. Increased resistance to oven blackening is a very important property of the highly plasticized compositions, since these compositions are often used for molds to cast plaster and other like substances and it becomes frequently desirable to melt and recast a mold many times during the life of the composition.

Any of the usual pigments, fillers, dyes, and the like may be added to the compositions of this invention in order to give varied physical properties.

The addition of mercaptoamides to polymeric compositions greatly reduces the aging by sunlight and heat which is evidenced by discoloration, cracking, and hardening of the composition. Although heretofore compositions containing no mercaptoamide stabilizer have been utilized in the preparation of various articles of manufacture, stabilization of the compositions of this invention by adding mercaptoamides thereto makes it possible to increase the wide use of vinyl resin compositions in many outdoor or indoor uses such as umbrellas, auto tops, molds, and the like.

This application is a continuation-in-part of my copending application, Serial No. 149,013, filed March 10, 1950.

Although specific embodiments of the invention have been disclosed herein, it is not intended to limit the invention solely thereto, but to include all of the obvious variations and modifications falling within the spirit and scope of the appended claims.

I claim:

1. A composition of improved stability to heat comprising a polymer of a chloroethylene having from 1 to 2 chlorine atoms attached to one only of the carbon atoms, and an N-hydrocarbon substituted amide of a mercapto-substituted aliphatic monocarboxylic acid.

2. A composition of improved stability to heat comprising a polymer of a chloroethylene having from 1 to 2 chlorine atoms attached to one only of the carbon atoms, a plasticizer therefor, and from 0.1% to 5% by weight of the polymer of an N-hydrocarbon substituted amide of a mercapto-substituted aliphatic monocarboxylic acid.

3. A composition of improved stability to heat comprising predominantly a polymer of a chloroethylene having from 1 to 2 chlorine atoms attached to one only of the carbon atoms, a plasticizer therefor, and from 0.1% to 5% by weight of the polymer of an N-hydrocarbon substituted amide of a mercapto-substituted aliphatic monocarboxylic acid, said hydrocarbon substituent containing from 1 to 10 carbon atoms.

4. A composition of improved stability to heat comprising predominantly a polymer of vinyl chloride, a plasticizer therefor, and from 0.1% to 5% by weight of the polymer of an N-hydrocarbon substituted amide of a mercapto-substituted aliphatic monocarboxylic acid, said hydrocarbon substituent containing from 1 to 10 carbon atoms.

5. A composition of improved stability to heat comprising predominantly a polymer of a chloroethylene having from 1 to 2 chlorine atoms attached to one only of the carbon atoms, a plasticizer therefor, and an N-aryl-beta-mercaptopropionamide.

6. A composition of improved stability to heat comprising predominantly a polymer of a chloroethylene having from 1 to 2 chlorine atoms attached to one only of the carbon atoms, a plasticizer therefor, and from 0.1% to 5% by weight of the polymer of an N-aryl-beta-mercaptopropionamide, said aryl radical containing from 6 to 10 carbon atoms.

7. A composition of improved stability to heat comprising predominantly a polymer of vinyl chloride, a plasticizer therefor, and from 0.1% to 3% by weight of the polymer of an N-aryl-beta-mercaptopropionamide, said aryl radical containing from 6 to 10 carbon atoms.

8. A composition of improved stability to heat comprising 100 parts by weight of a polyvinyl chloride, a plasticizer therefor, and from 0.1 to 3.0 parts by weight of N-phenyl-beta-mercaptopropionamide.

9. A composition of improved stability to heat comprising 100 parts by weight of polyvinyl chloride, a plasticizer therefor, and from 0.1 to 3.0 parts by weight of N-o-tolyl-beta-mercaptopropionamide.

10. A composition of improved stability to heat comprising 100 parts by weight of polyvinyl chloride, a plasticizer therefor, and from 0.1 to 3.0 parts by weight of N-p-tolyl-beta-mercaptopropionamide.

THOMAS H. SHELLEY, Jr.

No references cited.